(12) United States Patent  
Dersy et al.

(10) Patent No.: US 9,141,325 B2
(45) Date of Patent: Sep. 22, 2015

(54) COMMUNICATIONS MANAGEMENT

(71) Applicant: Amadeus S.A.S., Sophia Antipolis (FR)

(72) Inventors: Julien Dersy, Guildford (GB); David Orton, Bucks (GB)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 13/756,823

(22) Filed: Feb. 1, 2013

(65) Prior Publication Data

US 2014/0223043 A1   Aug. 7, 2014

(51) Int. Cl.
G06F 13/12 (2006.01)
G06F 13/38 (2006.01)
G06F 3/12 (2006.01)
G06F 9/44 (2006.01)
H04W 76/00 (2009.01)
G06F 13/10 (2006.01)

(52) U.S. Cl.
CPC ............ *G06F 3/1292* (2013.01); *G06F 9/4445* (2013.01); *G06F 13/10* (2013.01); *H04W 76/00* (2013.01)

(58) Field of Classification Search
CPC ...................................................... G06F 9/455
See application file for complete search history.

(56) References Cited

U.S. PATENT DOCUMENTS

| 6,026,238 | A  | * | 2/2000  | Bond et al. ...................... 717/141 |
| 7,966,622 | B1 | * | 6/2011  | Purser et al. ................... 719/321 |
| 8,032,353 | B1 |   | 10/2011 | Baron et al. |
| 8,479,195 | B2 | * | 7/2013  | Adams et al. ...................... 718/1 |
| 2006/0041651 | A1 |   | 2/2006  | Walcutt et al. |
| 2007/0244966 | A1 | * | 10/2007 | Stoyanov et al. ............. 709/204 |
| 2008/0288940 | A1 | * | 11/2008 | Adams et al. ..................... 718/1 |
| 2009/0043921 | A1 |   | 2/2009  | Roy |
| 2009/0248458 | A1 | * | 10/2009 | Ouellette et al. ................. 705/5 |
| 2011/0106929 | A1 |   | 5/2011  | Lee et al. |
| 2012/0011499 | A1 | * | 1/2012  | Conover et al. ................... 718/1 |
| 2012/0158822 | A1 | * | 6/2012  | Dai et al. ...................... 709/203 |
| 2012/0167044 | A1 |   | 6/2012  | Fortier et al. |
| 2012/0206751 | A1 | * | 8/2012  | Bradshaw et al. ........... 358/1.13 |
| 2012/0297379 | A1 | * | 11/2012 | Anderson et al. ................. 718/1 |
| 2013/0166629 | A1 | * | 6/2013  | Ivashin et al. ................ 709/203 |
| 2014/0223043 | A1 | * | 8/2014  | Dersy et al. ..................... 710/62 |

FOREIGN PATENT DOCUMENTS

EP        2763037 A1   8/2014
WO     2011022375 A1   2/2011

* cited by examiner

Primary Examiner — Elias Mamo
(74) Attorney, Agent, or Firm — Thompson Hine LLP

(57) ABSTRACT

Systems and methods for managing communication between a server and peripheral devices associated with at least one client deployed with an airport environment so that a virtualized application running on the server can be connected with at least one of the peripheral devices. A communications link is established between the server and the client associated with the peripheral devices and the application is directed to one of the peripheral devices via a virtual channel established between a server peripheral manager simulator component and a client peripheral manager simulator component and passing through the communications link. The client peripheral manager simulator is associated with a peripheral manager in the client which controls the peripheral devices.

20 Claims, 6 Drawing Sheets

COMMUNICATIONS MANAGEMENT

BACKGROUND

The present invention relates to communications management and, more particularly, to the management of communication between peripheral devices within a virtualised communications system for airports.

In airport communication systems, a peripheral manager containing device drivers forms part of a client computer system which is geographically local to and is directly connected to one or more peripherals via a local communications system. Such a peripheral manager is constrained in establishing communications with central server-based applications due to the use of non-static internet protocol (IP) addresses and the requirement for IP address translation when the communication needs to traverse networks comprising a mix of public and private addressing schemes.

Within airport environments, workstations (including thin client devices, mobile/tablet devices) and peripheral devices may be shared for multiple airline usage. However, different airlines tend to utilise different systems and a problem arises where the same peripheral devices need to communicate with those different systems. One way of providing such communication requires the adaptation of existing client applications and print emulators to target remote hostnames in conjunction with addressing schemes based on fixed IP addresses. However, this is problematic for a number of reasons, including: the limited availability of public IP addresses; the complexity associated with security, firewalls and mobile data modes where 3G and/or 4G networks are used; the need for many routing configurations that need to be established and effectively managed; and the need to manage multiple stakeholders providing different elements of the communications, for example, airport authorities, network providers, airport information technology providers etc.

In systems where a host computer is required to be in communication with a remote client computer, multiple addressing schemes and translation across heterogeneous local and wide area networks, including mobile carrier networks, are required to enable communications between the host computer and the remote client computer. In this case, it is difficult to establish a reliable link irrespective of the multiple addressing schemes and the different types of networks required for the necessary communication.

SUMMARY

The embodiments of the present invention provide systems and methods for virtualising applications between a host computer and at least one remote client computer. The embodiments of the present invention provide methods for managing the communication of peripheral devices deployed within an airport environment via a virtualised communications protocol. The embodiments of the present invention may enable virtualised applications running on a server to establish communications with client-based peripheral managers and their associated peripheral devices.

In accordance with a first embodiment of the present invention, a system is provided for operating a peripheral device associated with a client from a server. The system includes a server being configured for running at least one application, and at least one client being configured to be connected to the server via a communications link, at least one peripheral device associated with each client. The server includes an application virtualisation platform for virtualising at least one application running thereon. Each client includes a client virtualisation platform for interacting with the application virtualisation platform. A peripheral manager is associated with each client and is configured for controlling each associated peripheral device. The system includes at least one peripheral manager simulator configured to establish a virtual channel through which communication is enabled between at least one application running on the server and at least one peripheral device associated with at least one client.

Advantageously, the provision of the virtualisation platforms on the server and each client may enable applications running on the server to interact with one or more clients at the same time via virtual channels established between each client and the server. This means that the server can be located at any suitable location with the clients located at various remote locations with respect to the server.

In addition, by the establishment of effectively dedicated virtual channels between each client and the server, different applications on the server can be accessed by each client and connected to relevant client-associated peripheral devices without having to compensate for different types of multiple addressing schemes and translation across heterogeneous local and wide area networks, including mobile carrier networks.

Each peripheral manager simulator preferably comprises at least one client peripheral manager simulator component associated with each client and a server peripheral manager simulator component associated with the server, the virtual channel being established between the server peripheral manager simulator component and the client peripheral manager simulator component.

In one embodiment, each server peripheral manager simulator component may be embedded in at least one application on the server. In another embodiment, each server peripheral manager may be connected to at least one application on the server.

Each application may further comprise a peripheral emulator and each server peripheral manager simulator component connects with each application by way of the peripheral emulator.

The system may further comprise an interface provided between the peripheral emulator and the server peripheral manager simulator component. In one embodiment, the interface may comprise a common use passenger processing system.

In one embodiment, the peripheral emulator may comprise a print emulator and at least one of the peripheral devices connected to at least one client comprises a printer.

The communication link may comprise at least a 3G or a 4G mobile telecommunications network.

In accordance with another aspect of the present invention, method is provided for connecting at least one application on a server to at least one peripheral device associated with at least one client connected to the server. The server has an application virtualisation platform and each client having a client virtualisation platform. The method includes establishing a communications link between the server and at least one client, virtualising communication protocols associated with each client and making the virtualised communications protocols available to the application virtualisation platform on the server, connecting at least one application on the server to at least one client using the client communication protocol, establishing a virtual channel between a server peripheral manager simulator component and at least one client peripheral manager simulator component within the communications link, and operating at least one peripheral device associated with at least one client using the established virtual channel between the server peripheral manager simulator component and each client peripheral manager simulator component.

By establishing the virtual channel within the communications link, a reliable connection can be provided between the server and each client irrespective of the type(s) of communications network(s) at the locality of the client.

The method may further comprise transferring data from at least one peripheral device connected to a client to the server using the established virtual channel between the client peripheral manager simulator component and the server peripheral manager simulator component.

BRIEF DESCRIPTION OF THE SEVERAL VIEWS OF THE DRAWINGS

For a better understanding of the present invention, reference will now be made, by way of example only, to the accompanying drawings.

DETAILED DESCRIPTION

Figure 1:
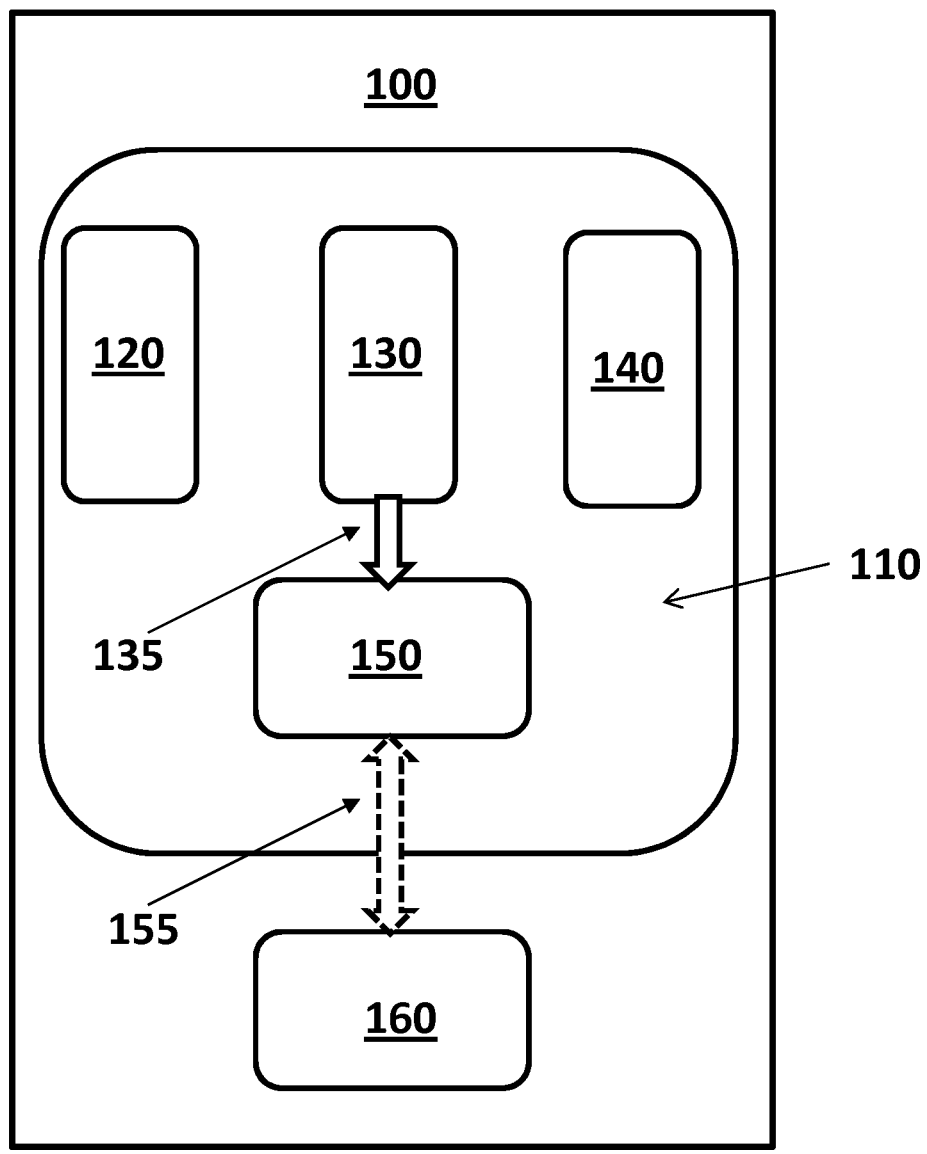
FIG. 1 illustrates a block diagram of a server in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The term "server" as used herein is intended to include any host computer that can connect to a communications network. In addition, the term "server" is also used to identify elements within the server.

The terms "remote client computer" or "client" as used herein are intended to include any computer or terminal that can connect to a server via a communications network. The term "client" is also used to identify elements within a remote client computer.

The term "emulator" as used herein refers to hardware or software that duplicates (emulates) the functions of a first computer system (for example, a client computer) in a second computer system (for example, a host computer) to provide an exact reproduction of the behaviour of the first computer system.

The term "simulator" as used herein refers to a hardware or software that provides a representation of the operation of a physical system over time using a model representing key characteristics and/or behaviours of the physical system.

The present invention is capable of exploitation by airports and any other parties that are involved in the provision of shared infrastructure to users in airport environments, including but not limited to, use in check-in and boarding areas, baggage claim desks and airline back offices. In addition, the present invention can also be utilised in non-airport environments.

This present invention provides a method for managing the communication with peripheral devices, such as printers, scanners and readers, deployed within an airport environment via a virtualised communications protocol extended over a network. Such a network may comprise of heterogeneous network types, including local area networks and wide area networks, the latter including fixed networks or 3G/4G data communications networks. (3G relates to the third generation of mobile communications for mobile telephones and comprises CDMA2000, a family of protocols that use code division multiple access systems, and Universal Mobile Telecommunications System (UMTS). CDMA is also known as International Mobile Telecommunications Multi-Carrier (IMT-MC). 4G relates to the fourth generation which provides mobile ultra-broadband internet access using, for example, Long Term Evolution (LTE).)

In particular, a method will be described which overcomes the challenges associated with communication between a remote central server and peripheral devices associated with airport-based clients where the communication may include multiple addressing schemes and translation across heterogeneous local and wide area networks, including mobile carrier networks. As mentioned above, the present invention can be implemented in any system in which communication is to be established where multiple addressing schemes are needed between a remote central server and a local client and associated peripheral devices.

In the system of the present invention, a server is in communication with at least one remote client computer. A server peripheral manager simulator simulates a peripheral manager on the server to communicate with a client peripheral manager in each remote client computer. The peripheral manager simulator preferably comprises a server peripheral manager simulator component and a client peripheral manager simulator component between which the virtual channel is established. The server peripheral manager simulator component and the client peripheral manager simulator component work together to simulate application communication from the server to each remote client computer so that the peripheral manager associated with each remote client computer can control the operation of its associated peripheral devices. Additionally, the virtual channel can also be used for data transfer between a peripheral device connected to the client and the server. In effect, the virtual channel is bi-directional.

Referring initially to FIG. 1, a server 100 in accordance with the present invention is shown which has a server-based application virtualisation platform 110. A plurality of applications 120, 130, 140 are shown running on the server 100 but which are virtualised on the application virtualisation platform 110. An emulator 150, for example, a print emulator, is associated with one particular application 130, for example, a print application. The application 130 interfaces with the print emulator 150 via connection 135 to provide print instructions for a peripheral device, for example, a printer (not shown) located at the location of the client.

In accordance with the present invention, a server peripheral manager simulator component 160 is provided at the server 100, the server peripheral manager simulator component 160 interfacing with the print emulator 150 via connection 155. The operation of the server 100 within the system of the present invention will be described in more detail with reference to FIGS. 4 to 6 below.

The application virtualisation platform 110 includes software which virtualises the applications 120, 130, 140 or an operation system (not shown) on which each application runs. The server peripheral manager simulator component 160 simulates a peripheral manager (as will be described in more detail below) to enable local communications with the application emulator 150, in this case, the print emulator. A Common Use Passenger Processing System (CUPPS) or any other suitable interface type may be provided which enables communication between the print emulator and the server peripheral manager simulator component 160. (CUPPS is effectively the next generation of Common Use Terminal Equipment (CUTE) in accordance with IATA Recommended Practice 1797.)

In the embodiment of the server 100 shown in FIG. 1, the application emulator 150 (or print emulator) is located within the application virtualisation platform 110. It may be connected to more than one application (not shown) if similar or identical applications are running on the server 100 and which require the same type of application emulation.

Figure 2:
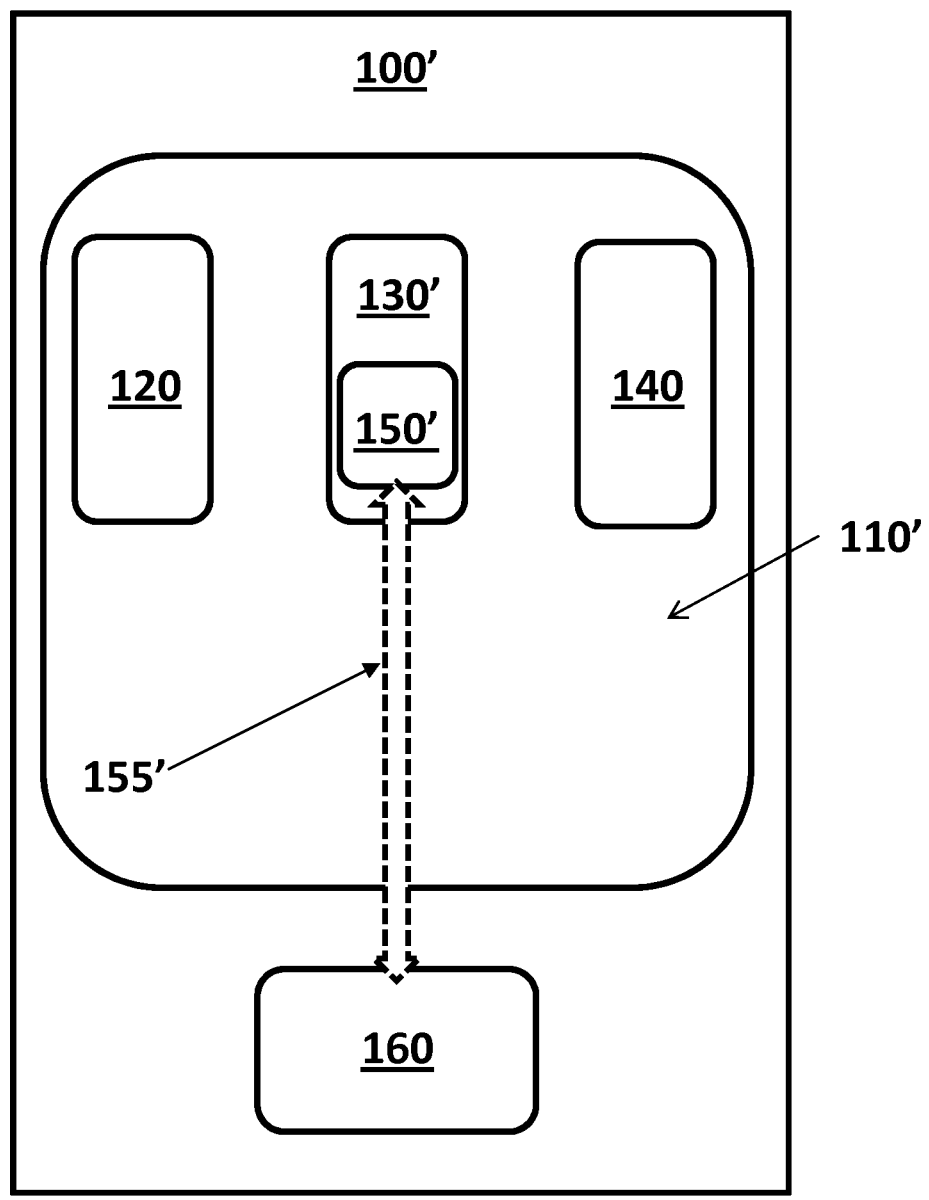
FIG. 2 is similar to FIG. 1 but illustrates another configuration of the server in accordance with the present invention.

In FIG. 2, a modified embodiment of the server 100' is shown. Elements which have been described above with reference to FIG. 1 have the same reference numerals and will not be described in detail again. In the embodiment of FIG. 2, the application virtualisation platform 110' has been modified so that the print emulator 150' forms part of the application 130' itself and interfaces with the server peripheral manager simulator component 160 via connection 155'. In this case, a suitable interface is provided to enable communications between the print (or application) emulator 150' and the server peripheral manager simulator component 160.

In a further embodiment (not shown), the server peripheral manager simulator component may be embedded in the application itself.

In an airport implementation, the server 100 (or 100') is located remotely from the airport itself and is connected thereto but means of conventional communications links. A single server 100 (or 100') may be connected to more than one airport as well as to different areas, for example, check-in, boarding gates, baggage halls and other airport front and/or back offices.

Figure 3:
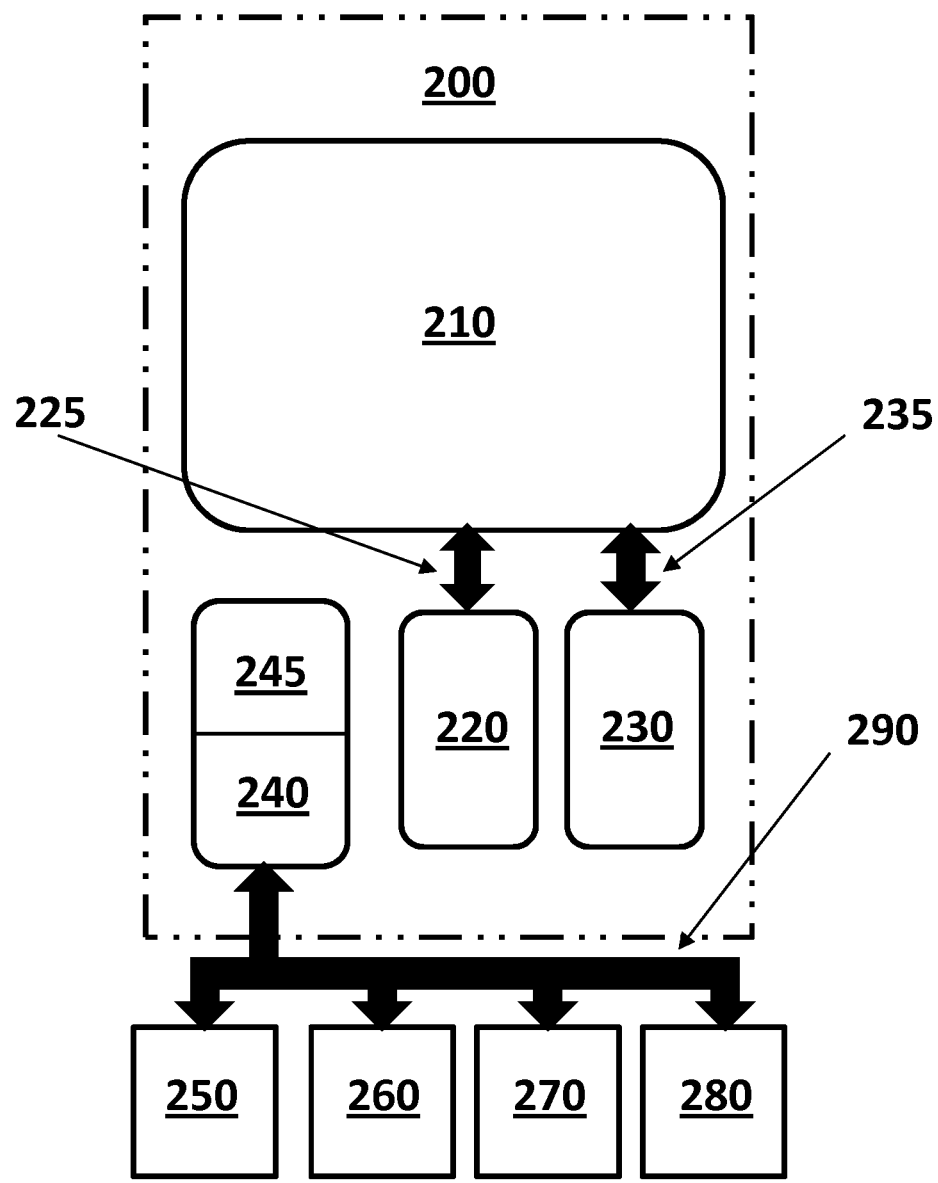
FIG. 3 illustrates a block diagram of a client in accordance with the present invention.

FIG. 3 illustrates a client 200 which is connectable to the server 100 (FIG. 1) or server 100' (FIG. 2) as will be described in more detail below with reference to FIGS. 4 to 6. The client 200 has a client virtualisation platform 210 which interfaces with a keyboard 220 and a display 230 as shown by respective links 225, 235. Although the keyboard 220 and display 230 are shown as separate elements, they may form part of a single module (not shown). The client 200 also includes a peripheral manager 240 which is connected for controlling peripheral devices 250, 260, 270, 280 via link 290. Typical peripheral devices which may be controlled by the peripheral manager 240 include, but are not limited to, printers, scanners, and readers. Whilst link 290 may be a physical link, for example, using a universal serial bus (USB) connection, the link 290 may also be a wireless link forming part of a local area network (LAN) or a wide area network (WAN). It is also possible that the link 290 operates using mobile telecommunications, for example, forming part of a 3G or 4G network or is connected via Bluetooth (wireless technology standard).

In accordance with the present invention, a client peripheral manager simulator component 245 is provided which is associated with the client peripheral manager 240. The client peripheral manager simulator component 245 is used to form a virtual channel (not shown) with the server peripheral manager simulator component 160 (FIGS. 1 and 2) as will be described in more detail below.

In an airport environment, a plurality of clients 200 would be provided within the airport itself, for example, at check-in desks, at boarding gates, in baggage halls etc. Each client 200 connects to the remote server 100 (or 100') to access applications running on the application virtualisation platform 110 (or 110') provided in the server 100 (or 100') as will be described in more detail below.

Figure 4:
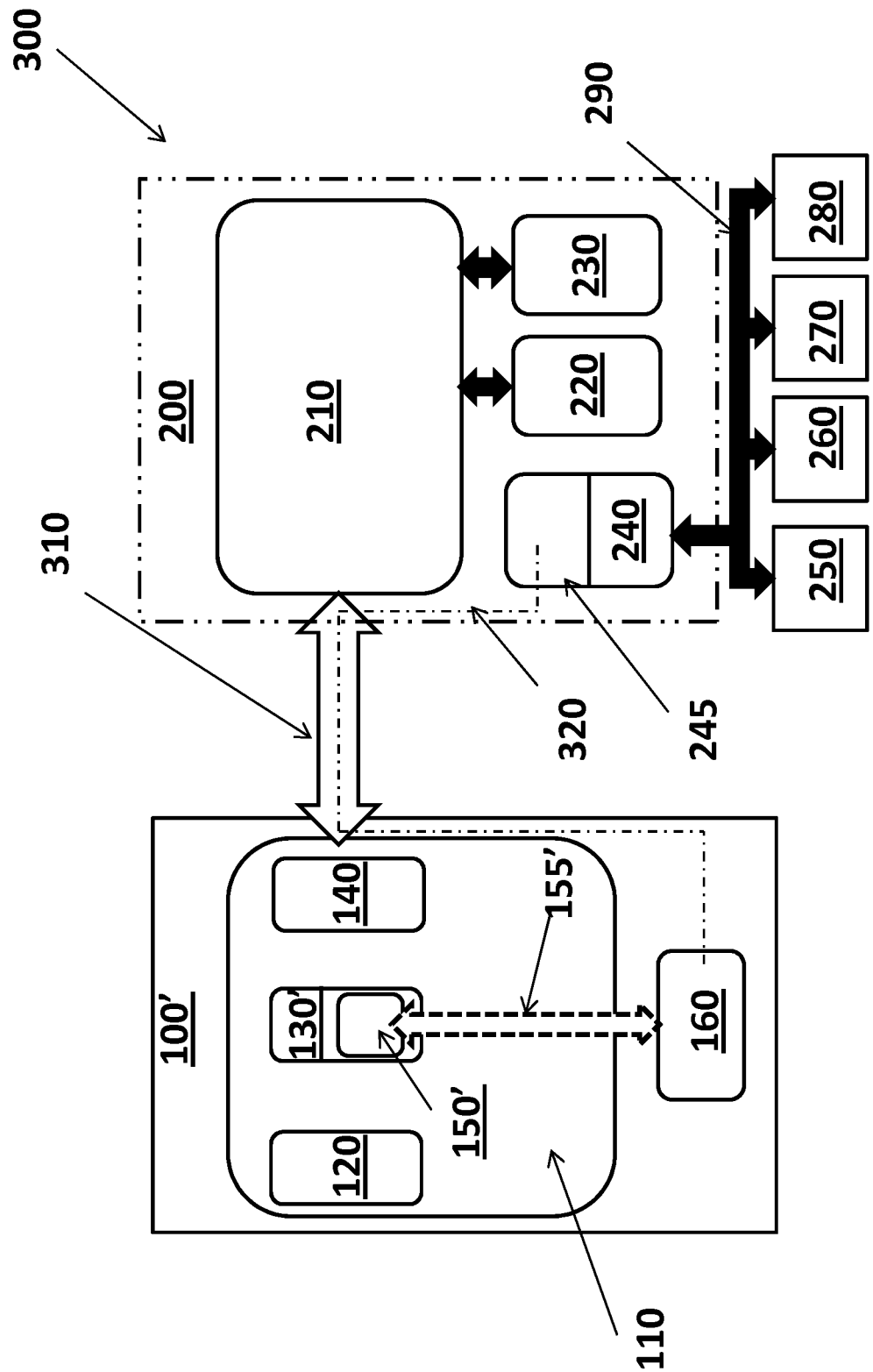
FIG. 4 illustrates a block diagram of a system in accordance with the present invention utilising the server of FIG. 2 and the client of FIG. 3.

In FIG. 4, a virtualisation system 300 in accordance with the present invention is shown. The system 300 comprises the server 100' as shown in FIG. 2, but it will be appreciated that this is by way of example and the server 100 shown in FIG. 1 could also be used. Elements of the server 100' as described above have the same reference numerals and will not be described in detail again here. The system 300 also includes the client 200 which is connected to the server 100' via a communications link 310. Communications link 310 may comprise a WAN or a LAN communications system which is capable of running a virtualisation protocol. As shown, the communications link 310 effectively connects the application virtualisation platform 110' to the client virtualisation platform 210. In particular, the communications link 310 comprises an internet protocol (IP) connection. In one embodiment, the virtualisation protocol utilises CITRIX XENSERVER on the server and CITRIX XENAPP on each remote client computer to provide the respective virtualisation platforms. However, it will be appreciated that other virtualisation protocols may be used, for example, VWWARE, and CITRIX applications are given by way of example.

In addition, in accordance with the present invention, the communications link 310 effectively connects the server peripheral manager simulator component 160 with the client peripheral manager simulator component 245 forming part of the client peripheral manager 240 using a virtual channel 320 as indicated by dot-dash line as will be described in more detail below.

The client virtualisation platform 210 includes software which allows communications with the server 100 via the application virtualisation platform 110' and manages the delivery of the virtualised application or operating system to the peripheral manager 240 at the client 200. The peripheral manager 240 includes suitable device drivers (not shown) for each peripheral device 250, 260, 270, 280.

The client peripheral simulator component 245 enables communication between the client virtualisation platform 210 and the peripheral manager 240. As shown, the client peripheral manager simulator component 245 can be embedded within the peripheral manager 240. Alternatively, the client peripheral manager simulator component 245 may stand alone within the client 200 (not shown).

In accordance with the present invention, the provision of the server peripheral manager simulator component 160 and the client peripheral manager simulator component 245 enables the virtualisation of the system as will be described below with reference to FIG. 6. Although not shown in FIG. 4, it is to be noted that the virtual channel 320 extends through the communications link 310 via the application virtualisation platform 110' and the client virtualisation platform 210.

Figure 5:
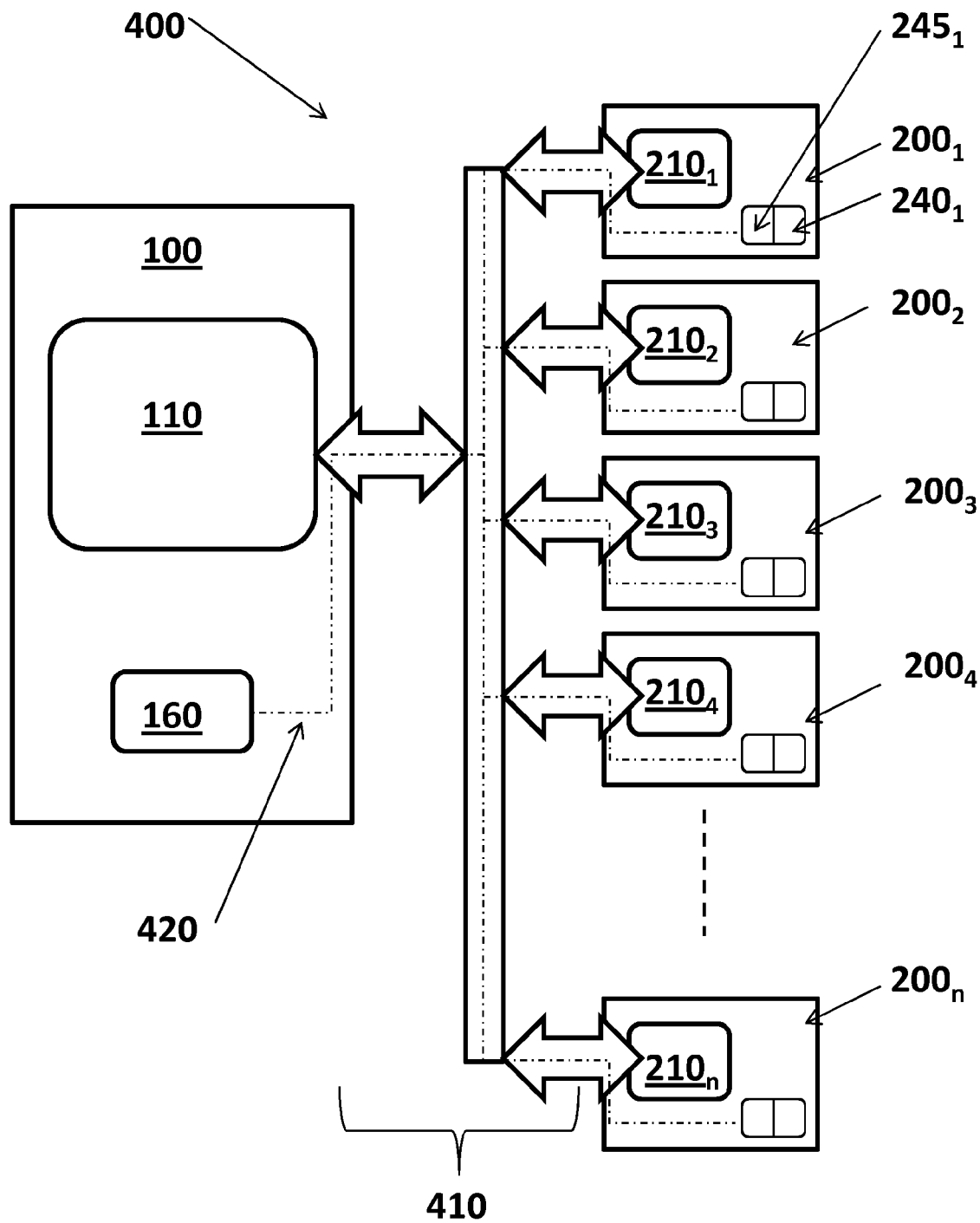
FIG. 5 illustrates a block diagram of a system in accordance with the present invention which comprises a server and a plurality of clients.

FIG. 5 illustrates a system 400 in which a plurality of clients $200_1$, $200_2$, $200_3$, $200_4$, ..., $200_n$ are connected to a single server 100. Each client $200_1$, $200_2$, $200_3$, $200_4$, ..., $200_n$ has its own client virtualisation platform $210_1$, $210_2$, $210_3$, $210_4$, ..., $210_n$ and own client peripheral manager and client peripheral manager simulator component. For clarity, only the client peripheral manager $240_1$ and client peripheral manager simulator component $245_1$ for one client $200_1$ is referenced, but it will be appreciated that the other clients also have client peripheral manager and client peripheral manager simulator components as shown.

The server 100 may be located at a central remote location and each client $200_1$, $200_2$, $200_3$, $200_4$, ..., $200_n$ may be located at any suitable location. For example, clients may be located at one airport or at a plurality of different airports all over the globe. As described above, the clients could also be located at locations, for example, at hotels or conference centres, where passengers can check-in prior to leaving for the airport.

As shown, a communications link 410 may be established between each of the clients $200_1$, $200_2$, $200_3$, $200_4$, ..., $200_n$ at the same time. A virtual channel 420 is also shown extending between the client peripheral manager simulator component $245_1$ and the server peripheral manager simulator component 160. Although not shown in FIG. 5, it is to be noted that the virtual channel 420 extends through the communications link 410 via the application virtualisation platform 110 and the client virtualisation platform 210.

Naturally, a virtual channel can also be established for the other client peripheral manager simulator components of each client $200_1$, $200_2$, $200_3$, $200_4$, ..., $200_n$. Each client $200_1$, $200_2$, $200_3$, $200_4$, ..., $200_n$ may access the same application at the same time, or alternatively, more than one application may be accessed by the same or different clients. It will be appreciated that each client $200_1$, $200_2$, $200_3$, $200_4$, ..., $200_n$ accesses the server 100 via its own dedicated virtual channel within the communications link 410, that is, a plurality of virtual channels can be established between the server peripheral manager simulator 160 and each client $200_1$, $200_2$, $200_3$, $200_4$, ..., $200_n$ via the link 410.

By hosting all applications to be used by the clients on a common server, updates need only be applied once on the server without recourse to any of the clients. This reduces the complexity of keeping individual clients running the same application(s) up-to-date. In addition, as different applications can be hosted, in an airport environment, different airlines or other users of the system can use different applications but still use the same remote client computer to access their applications on the server.

Figure 6:
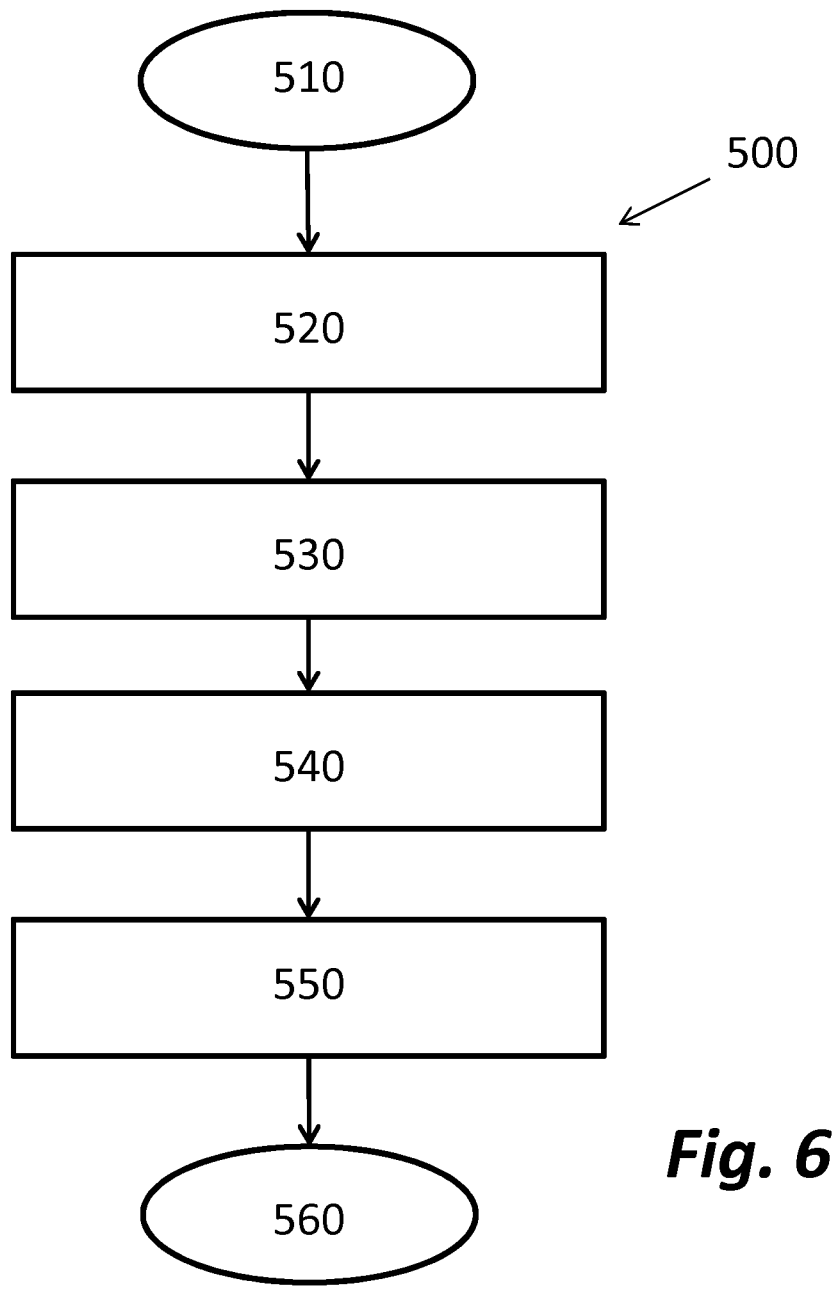
FIG. 6 is a flow chart illustrating the operation of the system shown in FIG. 4.

In FIG. 6, a flow chart 500 illustrating a method for operating the system is shown. Reference numerals relating to elements of the server 100' (FIG. 2), the client 200 (FIG. 3) and the system 300 (FIG. 4) are also used in the following description.

In block 510, a user logs onto the client using the keyboard 220 and the display 230 and initiates a session in which the client 200 is connected to the server 100' via communications link 310 (FIG. 4). The connection between the client and the server initialises at least one graphic user interface (GUI) for one of more applications on the server 100' by calling the IP address of the server 100'. At the same time, the server peripheral simulator component 160 is also initialised.

In block 520, the connection 310 is made between the client virtualisation platform 210 and the application virtualisation platform 110' on the server 100. A connection is established for the session via the virtualisation protocol according to the platform used, for example, using Citrix as described above, provided on the two platforms 110', 210 in block 530. Support for virtual channels within this protocol enables communications with peripherals to be reliably established and which are unaffected by network address translation and blocking due to the presence of firewalls.

In block 540, the client localhost/Transmission Control Protocol (TCP) is virtualised on the client virtualisation platform 210 and made available, via the connection 310 established in step 530, to the application 130' running on the virtualised platform 110' on the server 100'. In step 550, the virtual channel 320 is established between the initialised server peripheral manager simulator component 160 and the client peripheral manager simulator component 245. The application 130' connects to the client localhost/TCP made available on the application virtualisation platform 110' in step 540, is virtualised and redirected via the virtual channel 320 back to the client peripheral manager 240 via the client peripheral manager simulator component 245.

Once the virtual channel 320 is established, all communication between the application 130' and the peripheral device with which it is to communicate is performed via the virtual channel 320, that is, all data is transferred over the virtual channel 320, either from the server 100' to the client 200 or from the client 200 to the server 100'.

The virtual channel 320 can be established regardless of the type(s) of communications network(s) operating within the communications link 310 and effectively provides a channel of direct communication between the application 130' running on the application virtualisation platform 110' and one of the peripheral devices 250, 260, 270, 280 connected to the client 200 via link 290. As described above, the application 130' may be a print application and the peripheral device connected to the client 200 may be a printer.

Naturally, other functionality may be provided by the peripheral devices, for example, scanning or reading. In this case, the scan or read is passed back from the relevant peripheral device 250, 260, 270, 280 via link 290 to the server peripheral manager simulator component 160, via the associated client peripheral manager 240, the client peripheral manager simulator component 245 and the virtual channel 320. From the server peripheral manager simulator component 160, the scan or read is passed to an associated application within the application virtualisation platform 110'. The information relating to the scan or read may then be stored in a database or memory (not shown) if required.

In block 560, the session ends when the connection between the server 100' and the client 200 is terminated when the user logs off the client 200.

As described above, the server peripheral manager simulator component is launched each time the virtualised application is launched, that is, every time a client connects to the server. However, it is also possible to have a single server peripheral manager simulator component which provides a connection port for each instance of the virtualised application being launched on the server in response to the connection of a client with the server. The latter option is not preferred as all connections between clients and the server will be lost if the server peripheral manager simulator needs to be restarted for whatever reason.

A peripheral emulator is described above which is associated with the application on the server which needs to connect to a peripheral device on the client. However, in an alternative embodiment, its functionality can be included in the server peripheral manager simulator component.

Each computing system described herein, also referred to as a platform, client, server, or back end, may include at least one processing unit configured to execute one or more instructions to perform one or more operations consistent with embodiments of the invention. Each computing system generally includes an input/output ("I/O") interface, a display, and external devices. The I/O interface may be configured to receive data from the display and data from the external devices that is communicated to the processing unit and may be configured to output data from the processing unit to the display and external devices. The display may be, for example, a computer monitor or a screen on a mobile phone or a tablet. Alternatively, the display may be a touch screen that not only functions to permit a user to receive and view output data, but also functions to permit the user to input data with, for example, an onscreen virtual keyboard. The external devices may include, for example, additional user input devices such as a keyboard, a keypad, a mouse, a microphone, etc., and additional user output devices such as speakers, etc. The computing system may also include a network adapter, such as a network interface card or a transceiver, that supplies the physical connection with a network and that is configured to transmit data and receive over the network.

Each computing system includes a memory configured to store one or more software modules or applications and/or an operating system, where each application and the operating system each generally comprise one or more instructions stored as program code that may be read from the memory by each processing unit. The instructions, when executed by the processing unit, may cause the processing unit to perform one or more operations to thereby perform the steps necessary to execute steps, elements, and/or blocks embodying the various embodiments of the invention.

The memory may represent random access memory (RAM) comprising the main storage of a computer, as well as any supplemental levels of memory, e.g., cache memories, non-volatile or backup memories (e.g., programmable or flash memories), mass storage memory, read-only memories (ROM), etc. In addition, the memory may be considered to include memory storage physically located elsewhere, e.g., cache memory in a processor of any computing system in communication with the client device 16, as well as any storage device on any computing system in communication with the client device 16 (e.g., a remote storage database, a memory device of a remote computing device, cloud storage, etc.).

The routines and/or instructions that may be executed by the one or more processing units to implement embodiments of the invention, whether implemented as part of an operating system or a specific application, component, program, object, module, interface, engine element, tool, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code of any of the embodiments described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. By way of example, although the embodiments of the present invention has been described with reference to an airport environment in which airport-related applications are run with each client corresponding to a check-in terminal, for example, connected to a single server, it will be appreciated that the present invention can also be used in non-airport environments irrespective of worldwide location, for example, cruise liner terminals, ferry terminals, hotels, resorts and conference centres, that is, any application where multiple clients need to establish a connection with a server to access the same application over a communications link having multiple addressing schemes and translation across heterogeneous local and wide area networks, including mobile carrier networks, to enable communications between applications running on the server and peripheral devices associated with the clients. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A system for remotely operating a printer, a scanner, or a reader comprising:
    a server comprising a first virtualisation platform for virtualising at least one application comprising a print emulator, a scan emulator, or a read emulator;
    a client configured to connect to the server via a communications link and comprising a second virtualisation platform for interacting with the first virtualisation platform, wherein the client is associated with the printer, the scanner, or the reader;
    a peripheral manager associated with the client and including a device driver configured to control the printer, the scanner, or the reader; and
    a simulator configured to simulate the peripheral manager including the device driver on the first virtualisation platform and establish a virtual channel through which communication is enabled between the at least one application and the printer, the scanner, or the reader by a common use passenger processing system.

2. The system of claim 1, wherein the simulator comprises a first component associated with the server and a second component associated with the client, the first component and the second component being configured to simulate the peripheral manager for the first virtualisation platform and the second virtualisation platform respectively, and the virtual channel is established between the first component and the second component.

3. The system of claim 2, wherein the first component is embedded in the at least one application.

4. The system of claim 2, wherein the first component is connected to the at least one application.

5. The system of claim 4, wherein each application comprises an emulator for the printer, the scanner, or the reader, and the first component connects with each application by way of the emulator of the respective application.

6. The system of claim 5, further comprising:
    an interface provided between the emulator of each application and the first component.

7. The system of claim 6, wherein the emulator of each application is the print emulator, and the system remotely operates the printer.

8. The system of claim 5, wherein the emulator of each application is the print emulator, and the system remotely operates the printer.

9. The system of claim 1, wherein the communications link comprises a 3G mobile telecommunications network.

10. The system of claim 1, wherein the communications link comprises a 4G mobile telecommunications network.

11. A method for connecting at least one application on a server to a printer, a scanner, or a reader associated with a client, the server having a first virtualisation platform for virtualising the at least one application comprising a print emulator, a scan emulator, or a read emulator, the client having a second virtualisation platform for interacting with the first virtualisation platform, and the client being associated with a peripheral manager including a device driver configured to control the printer, the scanner, or the reader, the method comprising:
    establishing a communications link between the server and the client;
    virtualising a communication protocol associated with the client;
    making the virtualised communications protocol available to the first virtualisation platform;
    connecting the at least one application to the client via the communications protocol;
    establishing, by a simulator configured to simulate the peripheral manager including the device driver, a virtual channel through which communication is enabled between the at least one application and the printer, the scanner, or the reader by a common use passenger processing system; and
    operating the printer, the scanner, or the reader via the common use passenger processing system.

12. The method of claim 11 further comprising:
    transferring data from the printer, the scanner, or the reader to the server via the virtual channel.

13. The system of claim 1, wherein the at least one application comprises a plurality of applications, each application being associated with a different airline.

14. The system of claim 13, wherein each application utilizes a different addressing scheme.

15. The system of claim 13, wherein the client is one of a plurality clients, and the server is configured to launch a plurality of instances of each application, each instance being for a different client.

16. The method of claim 11, wherein the simulator comprises a first component associated with the server and a second component associated with the client, the first component and the second component being configured to simulate the peripheral manager for the first virtualisation platform and the second virtualisation platform respectively, and further comprising:
    establishing the virtual channel between the first component and the second component.

17. The method of claim 16, wherein the first component is embedded in the at least one application.

18. The method of claim 16, wherein the first component is connected to the at least one application.

19. The method of claim 18, wherein each application comprises an emulator for the printer, the scanner, or the reader, and the first component connects with each application by way of the emulator of the respective application.

20. The method of claim 19, further comprising:
    providing an interface between the emulator of each application and the first component.

* * * * *